United States Patent
Buluschek

(10) Patent No.: US 6,179,949 B1
(45) Date of Patent: Jan. 30, 2001

(54) METHOD FOR MANUFACTURING A DRIP IRRIGATION TUBE AND DRIPPER UNIT THEREIN

(75) Inventor: Bruno Buluschek, Echandens (CH)

(73) Assignee: Swisscab S.A., Yvonand (CH)

( * ) Notice: Under 35 U.S.C. 154(b), the term of this patent shall be extended for 0 days.

(21) Appl. No.: 09/058,842

(22) Filed: Apr. 13, 1998

(30) Foreign Application Priority Data

Apr. 18, 1997 (EP) .................................................. 97106456

(51) Int. Cl.⁷ .................................................. B29C 47/02
(52) U.S. Cl. .............................. 156/244.13; 156/244.19; 29/433
(58) Field of Search .................... 156/244.13, 244.19; 239/542; 29/241, 433

(56) References Cited

U.S. PATENT DOCUMENTS

| | | | |
|---|---|---|---|
| 3,685,284 | * 8/1972 | Taubner | 63/4 |
| 5,022,940 | * 6/1991 | Mehoudar | 156/244.13 |
| 5,163,622 | 11/1992 | Cohen | 239/542 |
| 5,282,916 | * 2/1994 | Bloom | 156/244.13 |
| 5,310,438 | * 5/1994 | Ruskin | 156/244.13 |
| 5,324,379 | 6/1994 | Eckstein | 156/244.13 |
| 5,662,147 | * 9/1997 | Haiber | 139/384 R |
| 5,744,779 | * 4/1998 | Buluschek | 239/542 |
| 5,873,573 | * 2/1999 | Beatty | 273/336 |

FOREIGN PATENT DOCUMENTS 715926   11/1995   (EP) .

* cited by examiner

Primary Examiner—Michael W. Ball
Assistant Examiner—Barbara J. Musser
(74) Attorney, Agent, or Firm—Sughrue, Mion, Zinn, Macpeak & Seas, PLLC

(57) ABSTRACT

This method consists essentially in manufacturing dripper units (4) and attaching them longitudinally to a thread (16) by positioning them at intervals along the latter. For this purpose, the thread (16) is introduced into at least one notch (9) of the dripper unit (4) so as to clamp it. The width of the notch is less than the diameter of the thread. The thread fitted with dripper units is introduced into the tube (1) while the latter is being formed in an extruder so as to draw the dripper units (4) therein one after the other. The dripper units are then heat welded to the inner wall of the tube during its formation. The insertion of the thread (16) into the notch (9) is achieved via a wheel (18) onto whose the edge it is guided. In this manner, the whole method can be implemented continuously without any intermittent operations.

11 Claims, 5 Drawing Sheets

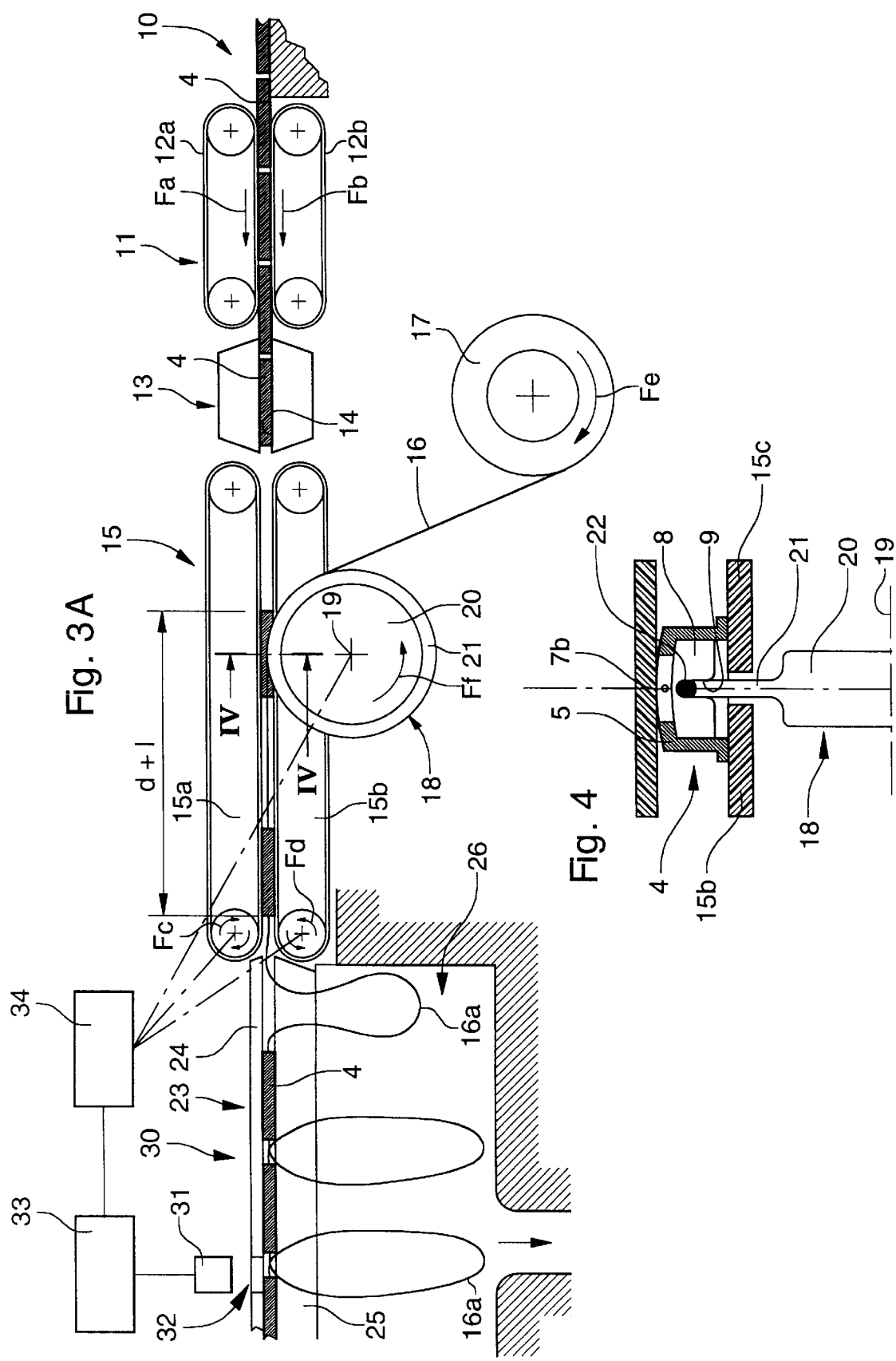

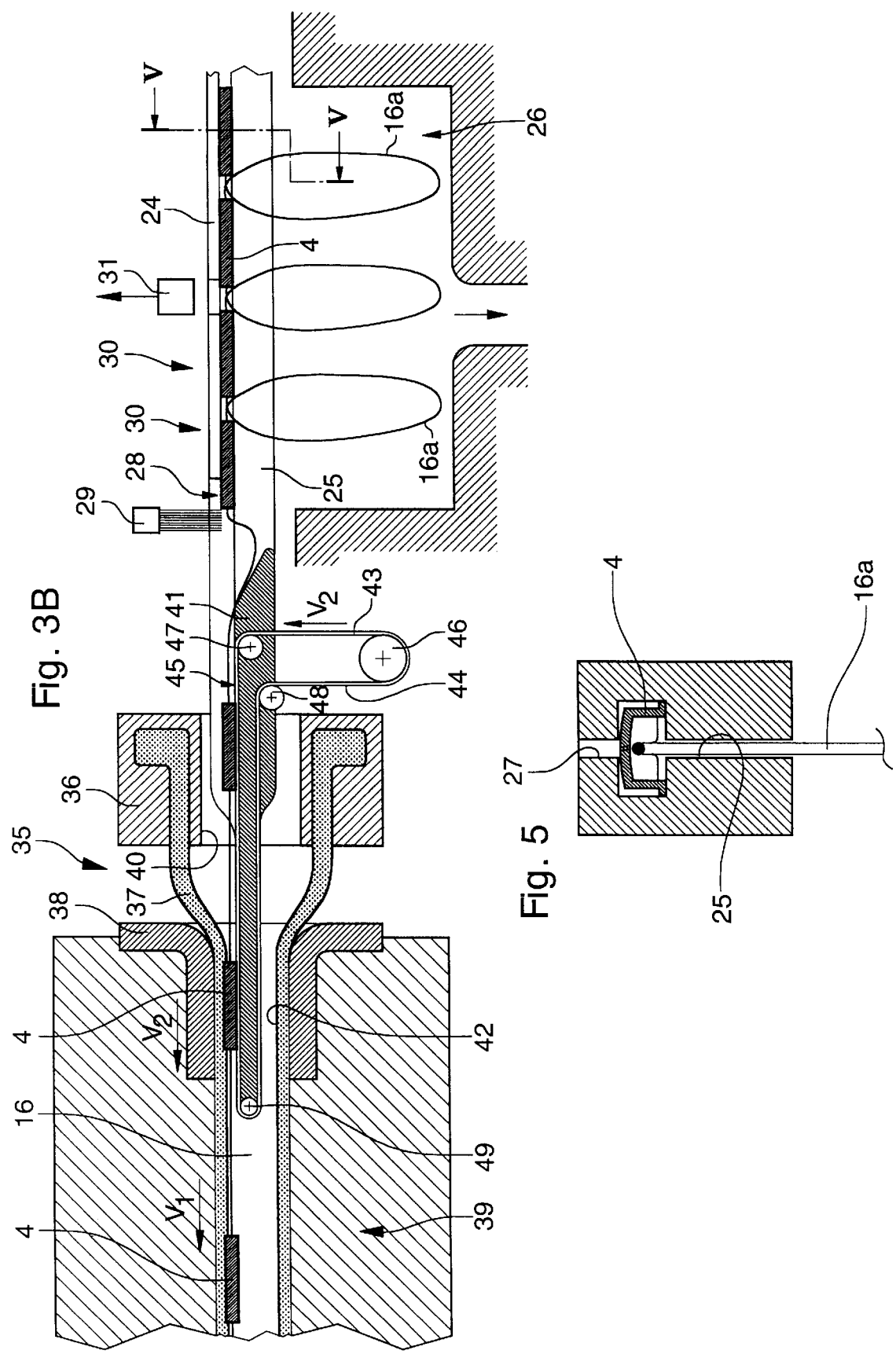

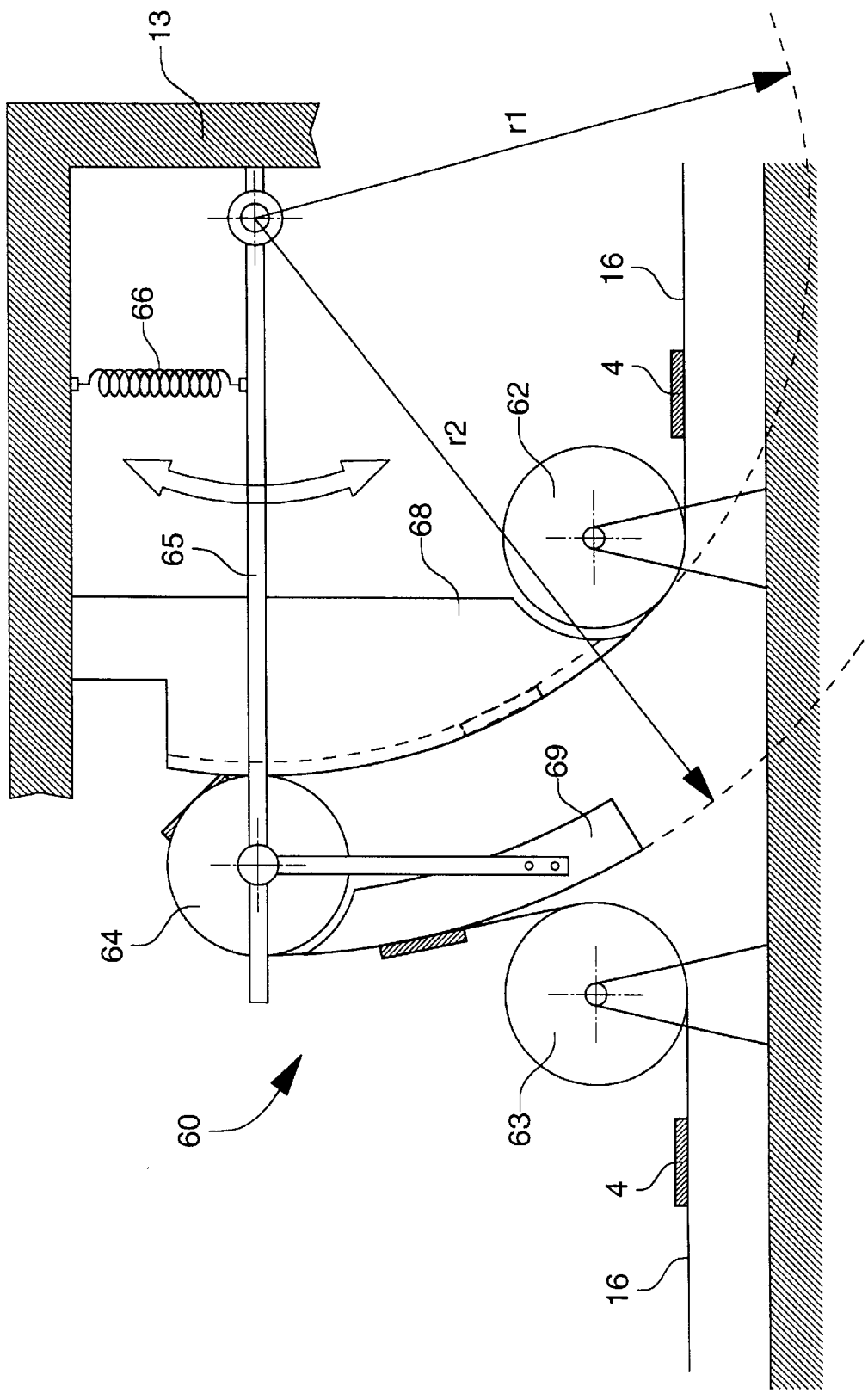

METHOD FOR MANUFACTURING A DRIP IRRIGATION TUBE AND DRIPPER UNIT THEREIN

BACKGROUND OF THE INVENTION

The present invention concerns a method for manufacturing a drip irrigation tube.

As is well known in the art, tubes of this type are perforated at regular distances with small holes through which the water can flow into the earth at a low flow rate. This flow rate is fixed by flow limiters called "dripper units" mounted within the tube facing the holes and having the shape of a small block attached to the inner surface of the tube. Limitation of the flow rate is assured by a labyrinth formed in the block. A description of such a "dripper unit" can be found in European Patent Application No 0 715 926 filed by the Applicant of the present invention.

A method for manufacturing drip irrigation tubes is known from U.S. Pat. No. 5,324,379. It consists of drawing the drips inside the tube while the latter is being formed in an extruder or an extruding station, the dripper units being attached to the inner wall of the tube via heat welding, when the latter is still warm at the extruder output. In order to do this, the dripper units are introduced into the tube in formation by being drawn by a thread to which they are attached longitudinally at points separated from each other by a distance equal to the distance which will separate them in the completed tube. The aforecited U.S. Patent provides several alternatives for fixing the dripper units to the thread. One of these alternatives, shown in FIGS. 9 to 14 of the Patent, consists in making knots in the thread and fitting each dripper unit with a slit driving lug extending at right angles to the dripper unit's direction of movement in the installation. The knots in the thread can be locked behind these lugs, in order for a given dripper unit to be able to be driven by the preceding one which is already attached to the tube in the extruder die.

The thread is knotted in a knotting station which takes an end of the thread to form each knot, this station being situated upstream of a station distributing the dripper units.

This method has a serious drawback which lies in the fact that it can only be intermittent, i.e. the thread must be stopped each time in order to form the knots. This has a direct effect on the global manufacturing speed of the tube. The other alternatives disclosed in this U.S. Patent allowing the dripper units to be attached to the thread all have the same drawback, the author of the Patent even envisaging preparing threads fitted with dripper units in advance and winding them onto reserve spools. In addition to the risk of seeing the thread and the dripper units becoming entangled when the spool is unwound, the manufacturing process has to be stopped periodically to replace an empty spool with a full spool loaded with a thread and dripper units, an operation which is no more satisfactory than those involved in the other alternatives disclosed.

SUMMARY OF THE INVENTION

An object of the invention is thus to provide a drip irrigation tube manufacturing method overcoming the aforecited drawbacks and allowing any intermittent operation during the irrigation tube manufacturing process to be voided.

The invention thus concerns a method as defined in claim 1.

As a result of the features of this method, the dripper units are attached to the thread during an operation which can be performed while the dripper units continue to move towards the extruder. This operation can be performed at the same speed as that at which the tube is formed, the thread also being drawn at this same speed.

Other features and advantages of the invention will appear during the following description, which is given solely by way of example with reference to the annexed drawings, in which:

BRIEF DESCRIPTION OF THE DRAWINGS

FIGS. 3A and 3B show via partial schematic lateral elevation views, an installation allowing the drip irrigation tube manufacturing method according to the invention to be implemented;

FIG. 4 is a large scale transverse cross-sectional view along the line IV—IV of FIG. 3A;

FIG. 5 is a transverse cross-sectional view along the line V—V of FIG. 3B and on the same scale as the latter, FIG. 6 shows an alternative embodiment of a waiting station allowing the method according to the invention to be implemented.

DESCRIPTION OF PREFERRED EMBODIMENTS

Figure 1:
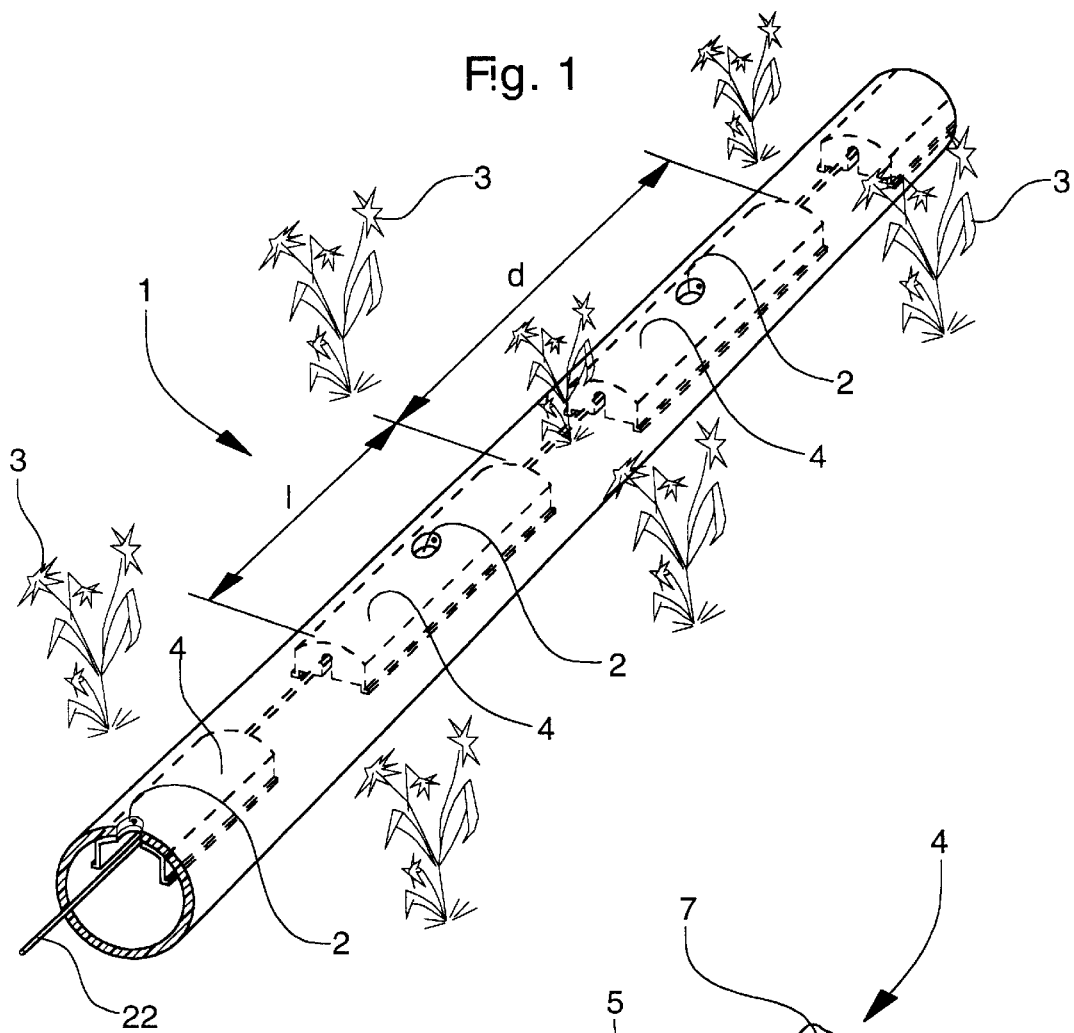
FIG. 1 is a perspective view of a section of drip irrigation tube according to the invention.

FIG. 1 shows a sprinkling or irrigation tube 1, made of plastic material, for example polyethylene, which has, at a given pitch, holes 2 through which water can flow at a low flow rate to water vegetables 3. Dripper units 4 are attached within tube 1 facing each hole 2, their structure being shown more clearly in FIG. 2.

Each dripper unit 4 takes the general form of a small oblong hollow block made of plastic material of a general parallelepiped shape whose surface 5, intended to be adjacent to the wall of tube 1, is curved to mould itself to said wall once dripper unit 4 is put in place. A collecting chamber 6, which communicates with a hole 2 of tube 1 and with passages 7 opening into the cavity 8 (visible in FIG. 4) delimited by the block of dripper unit 4, is formed in surface 5. Channels 7a and 7b forming a labyrinth connecting collecting chamber 6 to passages 7, are also made in surface 5.

In the completed tube, dripper units 4 are attached, preferably by heat welding, via their entire surface 5 to the inner face of tube 1. Collecting chamber 6 then opens into hole 2 through which water can flow at a predetermined rate through the labyrinth formed by channels 7a and 7b.

According to the invention, each dripper unit 4 has two notches 9 provided in the lugs formed, in the example, by the respective end walls delimiting cavity 8 in dripper unit 4. Each notch 9 opens towards the interior of tube 1 when dripper unit 4 is mounted in place. It will be seen hereinafter that the width of this notch 9 is carefully defined to fulfill one of the essential functions of the invention. It is to be noted that, according to an alternative, the body of dripper unit 4 could have only one notch 9 or, possibly, more than two notches distributed over its length in transverse walls or partitions passing through cavity 8.

It will be noted in FIG. 1 that the length of each dripper unit 4 is designated 1, while the pitch with which dripper units 4 are repeated in the longitudinal direction of tube 1 is designated d.

The method and the installation allowing a tube such as that shown in FIGS. 1 and 2 to be manufactured will now be described.

Figure 2:
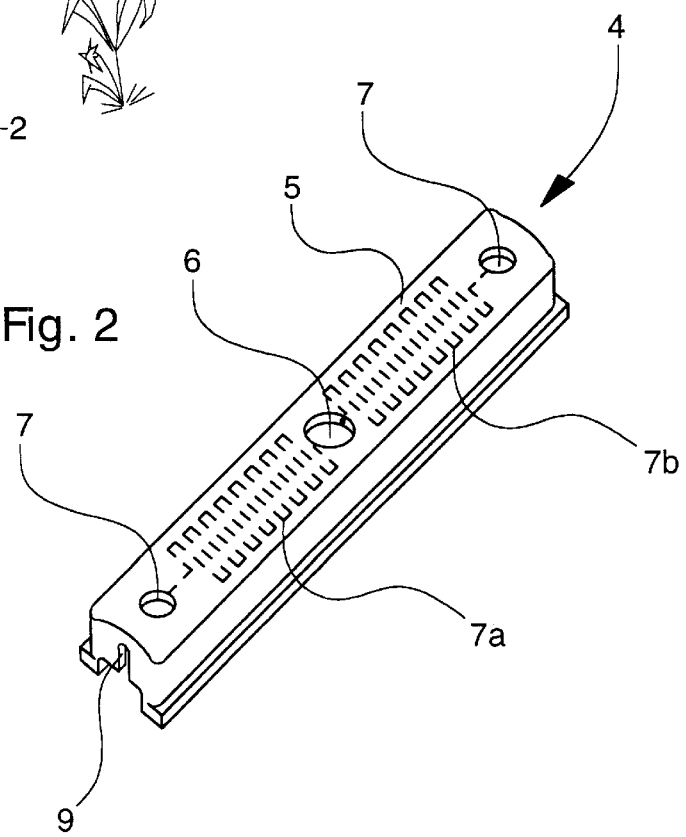
FIG. 2 is also a perspective view, on a larger scale, of a dripper unit used in the irrigation tube according to the invention.

Dripper units 4 in the form shown in FIG. 2 and manufactured in advance, are brought to point 10 (FIG. 3A), for example from a vibrating hopper feeder well known in the art (not shown in the drawings). Longitudinally positioned, they follow a rectilinear trajectory succeeding each other and being in contact with each other. They are thus introduced into a first conveyor or caterpillar type take off 11, hereinafter the "caterpillar". This caterpillar 11 includes an endless upper conveyor belt 12a and a lower endless conveyor belt 12b whose respective lower and upper sides are parallel and held apart from each other at a slightly smaller distance than the thickness of a dripper unit 4. As conveyor belts 12a and 12b are consequently driven in such a way that their respective lower and upper sides move in the direction of arrows Fa and Fb, dripper units 4 are driven longitudinally (towards the left in FIG. 3A). Caterpillar 11 is arranged for imposing on dripper units 4 a predetermined progression speed which is preferably fixed by the following ratio:

$$V_{ch11} = V_1 * 1/d$$

in which:

$V_{ch11}$ caterpillar 11 advancing speed, $V_1$ manufacturing speed of tube 1 l, d distance values indicated hereinbefore

First caterpillar 11 is followed by a transfer guide 13 formed by a block in which a passage 14 is arranged having a transverse rectangular cross-section substantially equal to the transverse cross-section of a dripper unit 4.

Guide 13 is followed by a station 15 for attaching dripper units 4 onto a thread 16. This station 15, hereinafter the "second caterpillar", includes three endless conveyor belts 15a, 15b and 15c (see also FIG. 4), namely an upper belt 15a and two lower belts 15b and 15c, these latter being placed side by side below upper belt 15a and each having a slightly smaller width than the width of belt 15a. Upper belt 15a is driven in the direction of arrow Fc and lower belts 15b and 15c are driven in the direction of arrow Fd. The lower side of belt 15a is situated at a distance from the upper sides of lower belts 15b and 15c, so as to arrange a gap between them whose height is slightly less than the thickness of a dripper unit 4.

The active length of second caterpillar 15 is preferably equal to approximately the sum of length l and distance d as defined hereinbefore.

Thread 16 is unwound from a spool 17 in the direction of arrow Fe. It may have a diameter of 0.5 mm for example, and be made of plastic material such as polyethylene or polypropylene.

Attaching station or second caterpillar 15 also includes an insertion wheel 18 rotatably mounted in the direction of arrow Ff about an axis 19 at right angles to the direction of progression of dripper units 4. This wheel 18 is formed of a disc 20 (FIG. 4) having a thin rim 21 whose edge is formed so as to have a circular concave groove 22 of a radius substantially corresponding to the radius of the cross-section of thread 16. The thickness of rim 21 is preferably 0.4 mm.

Insertion wheel 18 is placed relative to second caterpillar 15 in such a way that its peripheral portion rotates between lower belts 15b and 15c, and groove 22 is situated above the plane formed by the upper sides of said belts. Moreover, notches 9 formed in the end walls of dripper units 4 have a width which is less than the diameter of thread 16. Thus, according to an essential aspect of the invention, thread 16, by passing over insertion wheel 18, is inserted into notches 9 of each dripper unit 4 which passes between belts 15a, 15b and 15c, which is seen clearly in FIG. 4. This insertion causes thread 16 to be caught in notches 9 and thus thread 16 and dripper unit 4 to be attached. It will be noted that in order to facilitate insertion, notch 9 widens towards wheel 18.

Second caterpillar 15 is followed by a waiting station 23, a first portion of which appears in FIG. 3A, and a second portion of which appears in FIG. 3B. Waiting station 23 is essentially formed of a guide-bar 24 disposed longitudinally in the advancing direction of dripper units 4. It has over its entire length a longitudinal groove 25 of reverse T-shaped cross-section, the transverse bar having substantially the same cross-section as a dripper unit 4. Below guide-bar 24, groove 25 opens into a volume delimited by a caisson 26 in which a partial vacuum is maintained by suction (not shown). Above guide-bar 24, groove 25 communicates with the atmosphere through orifices 27 provided in steps in order to assure a draught through caisson 26. At the downstream end of guide-bar 24, groove 25 opens upwards towards an opening 28 of larger dimension in order to allow a brush 29 to pass, said brush being suspended above guide-bar 24 so as to obstruct groove 25. Thus, brush 29 act as a brake, the passage downstream of dripper units 4 being prevented by brush 29 which only yields if sufficient traction is exerted on said dripper units.

According to another essential aspect of the invention, waiting station 23 allows a waiting line 30 to form, consisting of a predetermined number of dripper units 4, which, when stopped by the brake or brush 29, accumulate behind each other in guide-bar 24, while thread 16 forms loops 16a as shown in FIGS. 3A, 3B and 5.

Waiting station 23 also includes a sensor 31 which is capable, through another opening 32 which enables groove 25 to communicate with the open air, of sensing the presence of a dripper unit 4 at this location and of counting the number of dripper units 4 in waiting station 23. Sensor 31 is connected to a control device 33 responsible for regulating, as a function of the number of dripper units 4 situated in waiting station 23, the speed of a driving motor 34 for belts 15a, 15b and 15c and for insertion wheel 18 in attaching station 15. The mechanical torque between motor 34 and belts 15a, 15b and 15c is represented by dot and dash lines in FIG. 3A.

The advancing speed of dripper units 4 into attaching station 15 is adjusted to a value VD equal to extrusion speed V2 of tube 1 increased or decreased by a correction value C which can vary as a function of the signal provided by sensor 31. Moreover, the length of belts 15a, 15b and 15c is chosen to be substantially equal to the value d+l (see FIG. 1). These arrangements allow a determined number of dripper units 4 always to be held in waiting line 30.

The installation according to the invention also includes an extrusion station 35. This station includes an extrusion head 36 receiving molten plastic material in a melting chamber (not shown), and supplying a semi-formed tube to a calibration cylinder or die 38. From there, formed tube 1 passes into a cooling station 39, then into a regulated drawing station and into a perforation station (not shown). In the latter, cooled tube 1 is perforated at intervals at right angles to collecting chambers 6 for dripper units 4. As these three stations of the installation are well known to those skilled in the art, they are not described in detail here.

A passage 38, through which extends a support table for dripper units 4, passes through extrusion head 35. Likewise, die 38 has a central passage 40 into which extends the downstream part of table 41. The latter is intended first to allow transfer of dripper units 4 to die 37 and, in said die, to assure application pressure of dripper units 4 against the inner wall of semi-formed tube 1, said pressure guaranteeing good heat welding of dripper units 4 to the wall of tube 1.

According to another important aspect of the invention, panel 41 is fitted with a third caterpillar 43 formed of an endless belt 44 whose upper side passes into a longitudinal groove 45 of panel 41, so that its upper surface is flush with the upper surface thereof. Endless belt 44 also passes over a motor device 46 and over return rollers 47, 48 and 49, while the lower side passes into a groove 50 made in the inner surface of panel 41. Motor device 46 is arranged to drive third caterpillar 43 at extrusion speed V2 of tube 1.

Third caterpillar 43 adds a particular advantage, especially when the wall of tube 1 has a relatively small thickness. Third caterpillar 43 is able to considerably reduce the friction undergone by dripper units 4 caused by their sliding over table 41, when they pass into die 38 where they are attached to tube 1. This is important to the extent that tube 1 has to transmit the traction force to dripper units 4 and to thread 16 allowing them to continue on from waiting line 30, the pressure with which dripper units 4 are made to be heat welded to the wall of tube 1 being able to be relatively significant.

In short, it has been established that, as a result of the method according to the invention, manufacturing of the irrigation tube can occur without any discontinuity, in particular without inopportune acceleration or deceleration of the moving elements in the installation and the tube being formed.

It will be noted that according to an alternative embodiment of the installation, waiting station 23 can be replaced by a dancer or take-up device 60 such as shown in FIG. 6. This dancer 60 includes conventionally two fixed pulleys 62 and 63 between which is inserted a moving pulley 64 connected to a first end of an arm 65 hinged by its second end onto a frame B.

Arm 65 is spring-biased to move the fixed pulleys away from each other as a result of return means 66 formed by a spring. These return means 66 may also be formed by a counterweight which is fixed in relation to the hinge axis of arm 65 on an opposite part to that carrying moving part 64. Thread 16 carrying dripper units 4 coming from second caterpillar 15 is thus deviated by fixed pulley 62 wound onto moving pulley 64, and again deviated towards extrusion station 36 by second fixed pulley 63. Dancer device 60 is associated with first guide means 68 fixed onto frame B, and to second moving guide means 69, attached to arm 65. Fixed guide means 68 are arranged between first fixed pulley 62 and moving pulley 64, while moving guide means 69 are arranged between moving pulley 64 and second fixed pulley 63. These guide means 68, 69 are essential for preventing any rotation of dripper units 4 about themselves before entry into the extrusion station. As a result of this dancer device 60, the advancing speed of dripper units 4 can thus be adjusted as a function of the extrusion speed.

Figure 7:
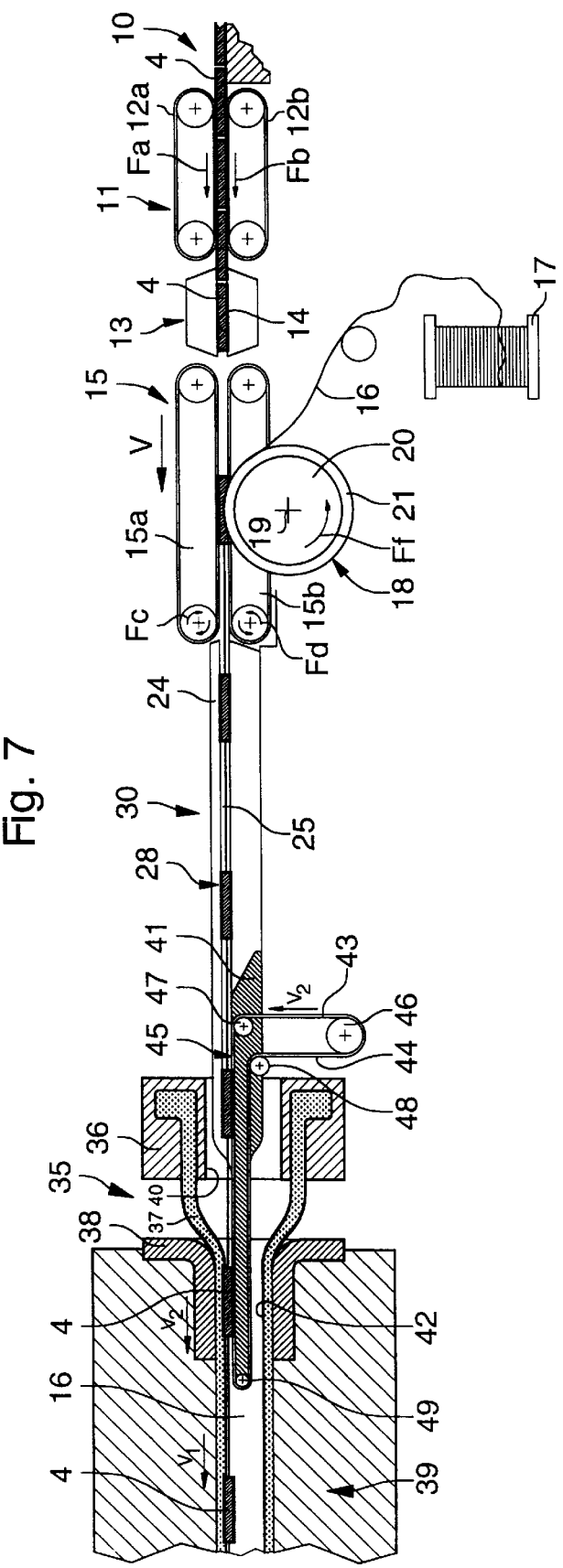
FIG. 7 shows another alternative embodiment of the installation allowing the method according to the invention to be implemented.

FIG. 7 shows another alternative embodiment of the installation wherein the same elements as those described in conjunction with the preceding Figures are designated by the same numerical references.

According to this variant, waiting station 23 has been omitted and replaced by a longitudinal groove similar to groove 25 described in conjunction with FIGS. 3A and 3B. Caterpillar 15 has also been shortened so that no more than one dripper unit 4 is driven by belts 15a and 15b at one time. Typically, the active length of caterpillar 15 is equal to three times the length of a dripper unit 4. In this variant, thread 16 is unreeled from spool 17 without tension, for example by flyer pay off. Thread 16 which carries dripper units 4 is thus only driven by the tube which has just been formed to which the dripper units are attached. This is made possible to the extent that the thread is unreeled without tension from spool 17, where the dripper units have a very low weight and where the friction coefficient of the dripper units in groove 25 is very low. Thus, during locking of the thread onto the dripper unit, the latter is driven by caterpillar 15 at a speed V substantially higher than V1 or V2. Since V is higher than V1 or V2, a little slack is created in the thread between caterpillar 15 and the extrusion station. As soon as the dripper unit which is attached onto the thread leaves caterpillar 15, the thread carrying dripper units 4 is driven only by the tube at speed V2. Caterpillar 15 thus only drives dripper unit 4 before and after attachment thereof to the thread, but never drives the thread alone.

What is claimed is:

1. A manufacturing method for a drip irrigation tube, comprising:

manufacturing dripper units, attaching said dripper units longitudinally to a thread by positioning them at intervals along the latter, introducing said thread inside said tube while the latter is being formed in an extruder or extrusion station so as to draw the dripper units therein one after the other, heat welding said dripper units to the inner wall of the tube during its formation, the resulting attachment allowing the thread and the dripper units to be moved forward at the same time as the tube, and cooling said tube and perforating the latter at right angles to each dripper unit in order to make it communicate with the exterior, said method further comprising:

providing said dripper units with clamping means during manufacturing thereof, and inserting said thread into said clamping means in order to obtain attachment of said dripper units to said thread before introduction thereof into said tube;

wherein said clamping means include at least one lug moulded to the body of the dripper unit on the side of said body opposite the wall via which it will subsequently be attached to said tube and at right angles to the direction of advancement of said thread during formation of said tube, said lug being provided with a notch whose width is smaller than the diameter of said thread;

said method further comprising:

drawing said dripper units in succession into a first caterpillar including an upper belt and two lower belts driven by conjugated movements, said lower belts being placed side by side below the upper belt and said dripper units being inserted in the gap between said belts, unreeling said thread from a spool by passing it over a portion of the periphery of an insertion wheel whose peripheral rim is concave over the edge and which projects into said gap between the two lower belts and which is driven by a rotational movement co-ordinated with the movement of said belts, said dripper units proceeding in said gap and being positioned so that said notch overlaps said peripheral edge so that said thread is caught in the notch of each dripper unit when the latter passes above said wheel.

2. A method according to claim 1, wherein l is the length of each dripper unit and is the pitch with which said dripper units are repeated in the longitudinal direction of the tube, and the length of said first caterpillar is substantially equal to l+d.

3. A manufacturing method for a drip irrigation tube, comprising:

manufacturing dripper units, attaching said dripper units longitudinally to a thread by positioning them at intervals along the latter, introducing said thread inside said tube while the latter is being formed in an extruder or extrusion station so as to draw the dripper units therein one after the other, heat welding said dripper units to the inner wall of the tube during its formation, the resulting attachment allowing the thread and the dripper units to be moved forward at the same time as the tube, and cooling said tube and perforating the latter at right angles to each dripper unit in order to make it communicate with the exterior, said method further comprising:

providing said dripper units with clamping means during manufacturing thereof, and inserting said thread into said clamping means in order to obtain attachment of said dripper units to said thread before introduction thereof into said tube; and forming a waiting line formed of a predetermined number of dripper units, after attachment thereof to said thread and prior to introduction thereof into said tube;

said method further comprising:

drawing said dripper units in succession into a first caterpillar including an upper belt and two lower belts driven by conjugated movements, said lower belts being placed side by said below the upper belt and said dripper units being inserted in the gap between said belts;

unreeling said thread from a spool by passing it over a portion of the periphery of an insertion wheel whose peripheral rim is concave over the edge and which projects into said gap between the two lower belts and which is driven by a rotational movement coordinated with the movement of said belts;

said dripper units proceeding in said gap and being positioned so that said notch overlaps said peripheral edge so that said thread is caught in the notch of each dripper unit when the latter passes above said wheel;

monitoring the number of dripper units placed in said waiting line; and varying the speed of progression of the dripper units in said first caterpillar and that of said thread on said wheel as a function of said number.

4. A method according to claim 3, wherein said speed of progression is equal to the extrusion speed of said tube decreased or increased by a correction factor defined as a function of said number of dripper units in the waiting line.

5. A method according to claim 2, further consisting in:

introducing said dripper units into said first caterpillar at a speed substantially equal to $V=V_1*l/d$, $V_1$ being the speed of progression with which said tube (1) undergoes said cooling operation.

6. A method according to claim 1, further consisting in:

causing said dripper units to progress into said extruder on a second caterpillar which passes longitudinally through the latter and extends substantially between the inlet of said extruder and a point where said dripper units adhere to the inner wall of said tube; and causing said caterpillar to progress at a speed substantially equal to the extrusion speed of said tube.

7. A method according to claim 6, further consisting in pressing said dripper units into said wall over a predetermined distance via said second caterpillar.

8. A method for manufacturing a drip irrigation tube comprising:

manufacturing dripper units, attaching said dripper units longitudinally to a thread by positioning them at intervals along the latter, introducing said thread inside said tube while the latter is being formed in an extruder so as to draw the dripper units therein one after the other, heat welding said dripper units to the inner wall of the tube during its formation, the resulting attachment allowing the thread and the dripper units to be moved forward at the same time as the tube, and cooling said tube and perforating the latter at right angles to each dripper unit in order to allow it communicate with the exterior, said method further comprising:

causing said dripper units to progress into said extruder on a caterpillar which passes longitudinally through the latter and extends substantially between the inlet of said extruder and a point where said dripper units adhere to the inner wall of said tube; and moving said caterpillar along at a speed substantially equal to the extrusion speed of said tube.

9. A method according to claim 8, further comprising pressing said dripper units into said wall over a predetermined distance via said caterpillar.

10. A method according to claim 1, wherein d is the pitch with which said dripper units are repeated in the longitudinal direction of the tube, wherein the length of said first caterpillar is less than d and wherein the spool is unreeled by flyer pay off.

11. A method according to claim 10, wherein the progression of said thread when no dripper unit is present in the first caterpillar is assured by the traction exerted on the thread by the tube via the dripper units which are attached thereto.

* * * * *